United States Patent
Mathur

(10) Patent No.: US 11,341,130 B2
(45) Date of Patent: *May 24, 2022

(54) PRECOMPILED SQL QUERIES THAT ALLOW FOR DYNAMIC SELECTION OF COLUMNS

(71) Applicant: salesforce.com, inc., San Francisco, CA (US)

(72) Inventor: Rohitashva Mathur, Walnut Creek, CA (US)

(73) Assignee: salesforce.com, inc., San Francisco, CA (US)

( * ) Notice: Subject to any disclaimer, the term of this patent is extended or adjusted under 35 U.S.C. 154(b) by 112 days.

This patent is subject to a terminal disclaimer.

(21) Appl. No.: 16/852,395

(22) Filed: Apr. 17, 2020

(65) Prior Publication Data

US 2020/0242117 A1 Jul. 30, 2020

Related U.S. Application Data

(63) Continuation of application No. 16/011,396, filed on Jun. 18, 2018, now Pat. No. 10,713,243.

(51) Int. Cl.
*G06F 16/2452* (2019.01)
*G06F 16/2455* (2019.01)
*G06F 16/22* (2019.01)
*G06F 16/242* (2019.01)

(52) U.S. Cl.
CPC ...... *G06F 16/24524* (2019.01); *G06F 16/221* (2019.01); *G06F 16/242* (2019.01); *G06F 16/2455* (2019.01)

(58) Field of Classification Search
CPC ............ G06F 16/24524; G06F 16/221; G06F 16/242; G06F 16/2455
See application file for complete search history.

(56) References Cited

U.S. PATENT DOCUMENTS

| | | | |
|---|---|---|---|
| 7,366,716 | B2 | 4/2008 | Agrawal et al. |
| 2003/0055814 | A1 | 3/2003 | Chen et al. |
| 2019/0384846 | A1 | 12/2019 | Mathur |

OTHER PUBLICATIONS

U.S. Appl. No. 16/011,396, Notice of Allowance dated Mar. 11, 2020.

*Primary Examiner* — William Spieler
(74) *Attorney, Agent, or Firm* — Wong & Rees LLP; Zhichong Gu

(57) ABSTRACT

A query to retrieve database values for a first subset of table columns in a database table is determined. Runtime column selection variables are set up to identify the first subset of table columns for data retrieval, and are dynamically bound to a prepared query statement with single-column query statements joined by interstitial union operators. Each single-column query statement in the prepared query statement specifies a single-column query directed to a corresponding table column with a corresponding predicate to be bound at runtime dynamically with a corresponding portion of the one or more runtime column selection variables. The predicate is evaluated to be true or false in dependence on whether the corresponding table column is in the first subset of table columns. The prepared query statement is executed to retrieve database values for the first subset of table columns in the database table.

20 Claims, 9 Drawing Sheets

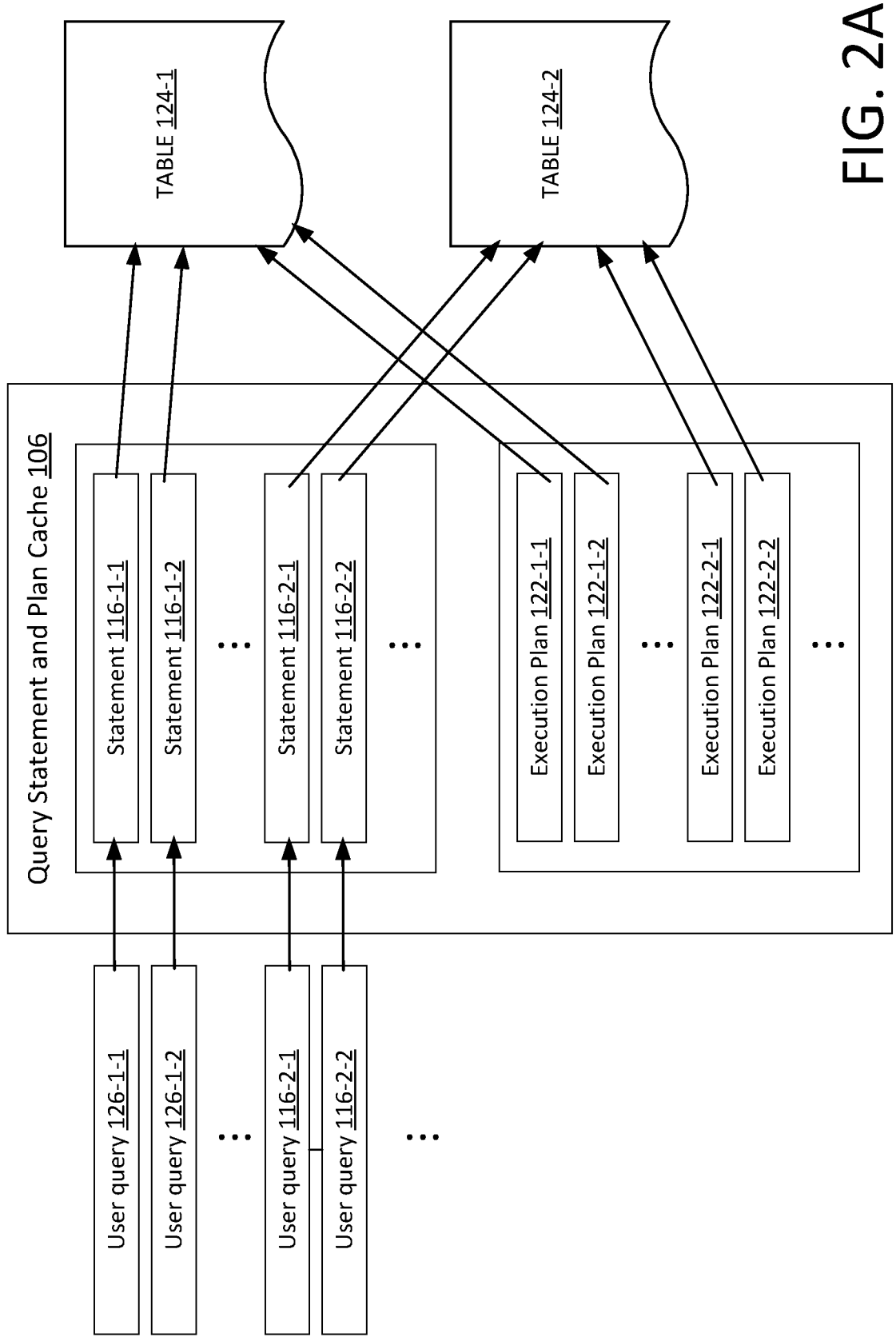

PRECOMPILED SQL QUERIES THAT ALLOW FOR DYNAMIC SELECTION OF COLUMNS

CROSS-REFERENCE TO RELATED APPLICATIONS

This application is a Continuation of U.S. patent application Ser. No. 16/011,396 filed on Jun. 18, 2018, the contents of which are incorporated herein by reference in their entireties. The applicant(s) hereby rescind any disclaimer of claim scope in the parent application(s) or the prosecution history thereof and advise the USPTO that the claims in this application may be broader than any claim in the parent application(s).

TECHNICAL FIELD

The present invention relates generally to cloud-based data retrieval, and in particular, to precompiled SQL queries that allow for dynamic selection of columns.

BACKGROUND

A large-scale cloud-based multitenant computing system may include multiple datacenters at various geographic locations to maintain millions of sets of application data for millions of organizations as well as provide millions of sets of application services such as those for customer relationship management (CRM), secured data access, online transaction processing, mobile apps, etc., to respective users and/or customers of these organizations.

Applications and/or services residing in the multitenant computing system may cause queries to be executed to retrieve application data in standard and custom objects or underlying database tables maintained by the multitenant computing system. Queries of the same table may use different SQL statements that look different from one another. Different target execution plans need to be prepared for these different SQL statements. Even if these execution plans may have been prepared before, they may not be in cache or may be expired from cache. As a result, these SQL statements still frequently go through time consuming and resource intensive recompiling of execution plans.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 2A and FIG. 2B illustrate example caching of precompiled query statements and pre-generated query plans;

DESCRIPTION OF EXAMPLE EMBODIMENTS

Figure 1A:
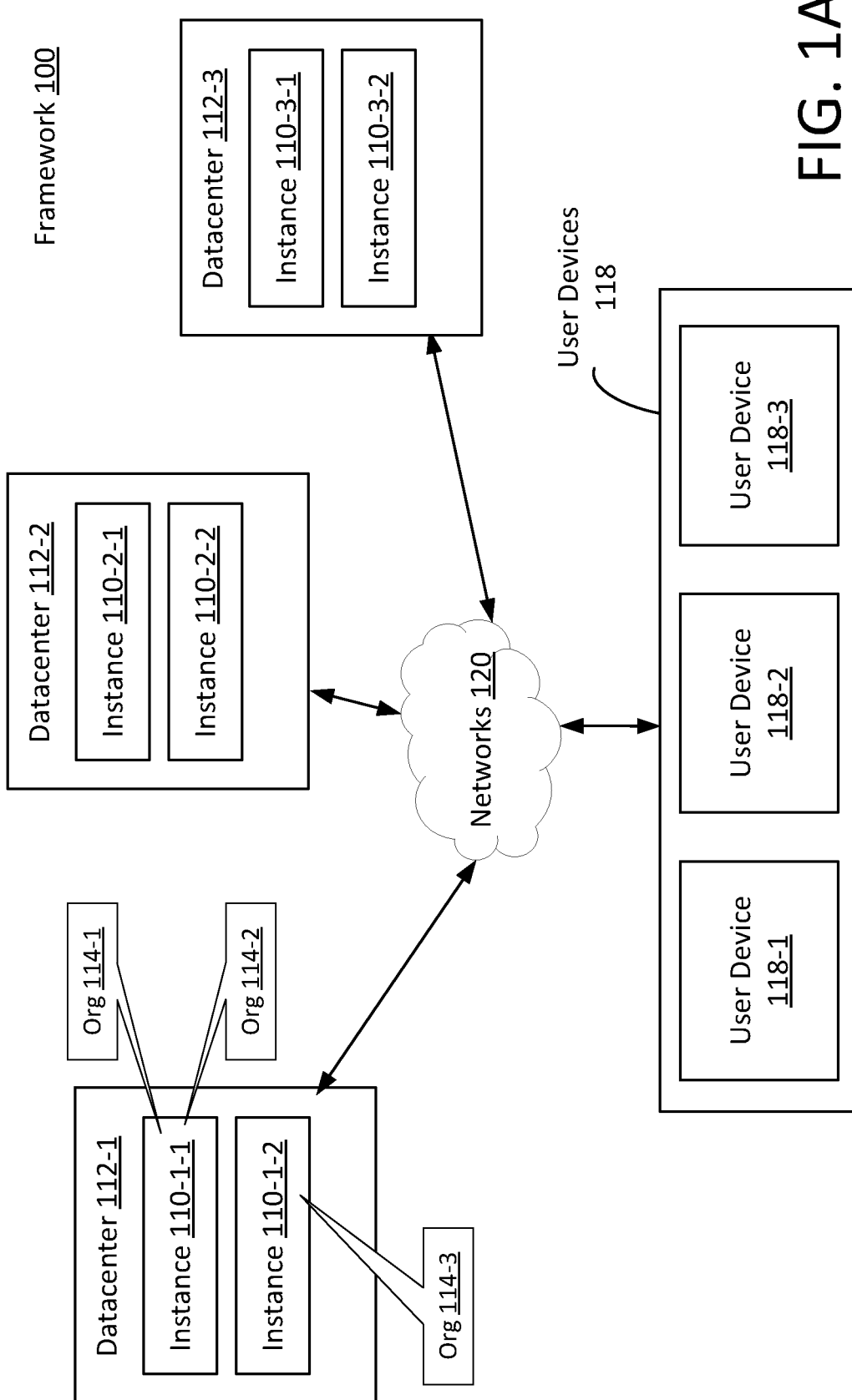
FIG. 1A illustrates an example overall query processing framework in a multitenant computing system.

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1.0. General Overview
2.0. Functional Overview
   2.1 Query Processing
   2.2 Example Union All Query Statements
   2.3 Parsing Select Results from Union All Query Statements
3.0. Example Embodiments
4.0 Implementation Mechanism—Hardware Overview
5.0. Extensions and Alternatives

1.0 GENERAL OVERVIEW

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

A server operating with a database engine and a database performs many possibly costly operations in processing received user queries. These operations may include, but are not necessarily limited to only, any of: generating or compose query statements based on user queries, compiling the query statements into executable query plans, carrying out the query plans to obtain select results of the query statements, using the select results to generate query results, returning the query results as responses to the user queries, and so forth.

Many overheads can be incurred along the way from receiving the user queries to returning the query results. For example, relatively heavy overheads are incurred when a database engine encounters a query statement the first time. The database engine has to expend significant amounts of resources and time to convert or compile the query statement into what is called a target execution plan or a query plan to access target data requested by the query statement. Costs of generating the query plan largely come from numerous options the database engine has to evaluate in order to determine an optimal join order, access paths, an evaluation order, etc., in addition to other (e.g., relatively small, etc.) costs such as parsing and validating the query statement. As the overall costs are quite high in compiling a query statement and generating the query plan, the database engine typically caches the query statement and the corresponding query plan for a certain amount of time. When the same query statement is seen the second time before the cached query statement and corresponding query plan are expired from the cache, the query statement need not be recompiled again but rather can be processed with the cached query plan without spending the significant overheads in generating the query plan.

However, different user queries (and/or other types of queries) may be directed to different combinations of columns in a table, thus strings representing query statements as generated based on the user queries could keep changing under some approaches. As a result, the database engine has to undertake expensive processing every single time the database engine encounters a string representing a query statement which cannot be found in the cache of the database engine.

Under techniques as described herein, a union all query statement may be used to, in effect, allow for selection of all columns present in a table, but does actual column selections based on column selection variables/parameters which (or whose values) are set dynamically at runtime to identify the columns of interest in the table. As used herein, the term "columns of interest" in a table refers to selected columns—or a proper subset of columns selected among all columns of the table—for column value retrievals. Thus, this union all query statement may be used to generate select results for numerous user queries directed to different combinations of columns in the table. In other words, these user queries can be covered by, or converted to, a common (cached) prepared SQL statement with column selection placeholders (e.g., parameters, bind variables, etc.) that can be dynamically bound to runtime variables to determine what columns are actually to be retrieved at runtime.

Significant amounts of overheads in resources and processing times—which otherwise would be incurred under other approaches—can be avoided under query optimization techniques as described herein. Additionally, optionally or alternatively, some or all of a variety of other query optimization techniques may also be applied to improve efficiency and performance and to optimize the actual query processing with the union all query statement. Being able to eliminate significant overheads and processing times is particularly significant in operational scenarios in which a system such as a large-scale cloud-based multitenant computing system has to process numerous user queries or other queries that dynamically select columns with either the same filter set or a largely common filter set. Under techniques as described herein, these different user queries to the same table can result in the same query plan in terms of joins (or unions) and access paths. Example applications of query optimization techniques as described herein may include, but are not necessarily limited to, any of: queries related to critical sections such as triggers, entity save operations, and ends of transactions where query code has to dynamically select columns of a table to retrieve column values from the selected columns of the table and to save query results derived from these column values to custom indexes, skinny tables, and/or (e.g., other, etc.) tables.

A union all query statement (e.g., a common query statement, a generalized query statement, a prepared SQL statement, a dynamic SQL statement, a precompiled non-SQL query statement, etc.) as described herein can be constructed for a table using a union-all query statement that comprises a plurality of component queries each of which is a single-column query statement with one or more predicates. The one or more predicates in each such single-column query statement (or each such query component) comprise column selection placeholders to be dynamically bound to values of runtime variables/parameters for the purpose of determining whether data values (or column values) of a corresponding column in each such single-column query are to be returned in combined select results of the union all query statement. The one or more column selection predicates can evaluate to TRUE or FALSE depending on whether the corresponding table column is to be identified by the runtime variables/parameters for data retrieval or not.

Using a union all query statement comprising select statements of single columns provides the most freedom in column selection in that such a union all query statement enables selections of individual columns on a per-column basis.

Additionally, optionally or alternatively, in some embodiments, a union all query statement may comprise select statements each of which is a select statement of more than one column. That is, the select statement can be used to select two, three, four, or even more columns, on a per-column-group basis.

By way of example but not limitation, the runtime variables/parameters may be standalone Boolean variables/parameters (e.g., individually named binary variables/parameters, etc.) or array variables/parameters (e g, named array variables/parameters with unnamed indexed binary-valued array elements, etc.) of Boolean values. These runtime variables/parameters can be set up to respectively identify each table column in a subset of table columns for data retrieval and to respectively identify each other table column outside the subset of table columns not for data retrieval. The runtime variables/parameters with their respective values set or generated at runtime based on a user query (which may or may not be a query statement or SQL statement in its own right) after the user query is received can be dynamically bound to the common prepared query statement.

Additionally, optionally or alternatively, the (cached) union all query statement may comprise expressions that generate special markers (e.g., special constant values, etc.) embedded in combined select results of the union all query statement to be use to separate or navigate to respective select results of different selected columns.

Additionally, optionally or alternatively, a row count query statement may be embedded in the union all query statement to determine the total number of result rows for each single-column select results. Additionally, optionally or alternatively, pivot operations may be implemented in a database procedure that invokes the union all query statement to allow for correct parsing of the combined select results of the selected columns into the respective select results for each selected column in the selected columns.

Data values (or column values) of the selected column in each single-column query statement can be converted by a specific data type conversion function from an original data type represented/defined in the database to a common data type, which may be the same across all selected columns and which may or may not be represented/defined in the database, to facilitate joining operations of select results of these selected columns with "UNION ALL" query statement keywords. Correspondingly, a specific inverse conversion function may be used to convert the data values of the selected column in each such single-column query statement from the common data type back to the respective original data type. The determination/identification of the specific data type conversion function and/or the specific inverse or reverse data type conversion function can be made based on schema information of the table that indicates the original data type represented/defined in the database for the selected column.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2.0 FUNCTIONAL OVERVIEW

FIG. 1A illustrates an example overall query processing framework 100 for migrating organizations hosted in a computing system. Example computing systems that implement the query processing framework (100) may include, but are not necessarily limited to: any of: a large-scale cloud-based computing system, a system with multiple datacenters, multitenant data service systems, web-based systems, systems that support massive volumes of concurrent and/or sequential transactions and interactions, database systems, and so forth. Various system constituents may be implemented through software, hardware, or a combination of software and hardware. Any, some or all of these system constituents may be interconnected and communicated directly, or through one or more networks 120.

In some embodiments, the computing system that hosts the organizations may comprise a plurality of datacenters such as 112-1, 112-2, 112-3, etc., which may be located at the same or different geographic locations such as the same or different continents, the same or different countries, the same or different states, the same or different regions, and so forth.

Each data center may implement a set of system instances to host respective organizations. These organizations may contract with the owner of the computing system such as a multi-tenant computing system to host their respective (e.g., organization-specific, organization-common, etc.) application data, to provide their (e.g., organization-specific, organization-common, etc.) application services to their respective users and/or customers. Examples of application data may include, but not necessarily limited to only, organization-specific application data, organization-common application data, application configuration data, application data, application metadata, application code, etc., specifically generated or configured for (e.g., organization-specific, organization-common, etc.) application services of an individual organization.

As used herein, the term "organization" may refer to some or all of (e.g., complete, original, a non-backup version of, a non-cached version of, an online version of, original plus one or more backup or cached copies, an online version plus one or more offline versions of, etc.) application data of an organization hosted in the computer system and application services of the organization based at least in part on the application data.

As illustrated in FIG. 1A, each datacenter (e.g., 112-1, 112-2, 112-3, etc.) may comprise a set of one or more system instances. A first datacenter 112-1 comprises first system instances 110-1-1, 110-1-2, etc.; a second datacenter 112-2 comprises second system instances 110-2-1, 110-2-2, etc.; a third datacenter 112-3 comprises third system instances 110-3-1, 110-3-2, etc.

Each system instance (e.g., 110-1-1, 110-1-2, 110-2-1, 110-2-2, 110-3-1, 110-3-2, etc.) in the hosting computing system can host up to a maximum number of organizations such as 5,000 organizations, 10,000 organizations, 15,000+ organizations, etc. As illustrated in FIG. 1A, the system instance (110-1-1) in the datacenter (112-1) may host a first organization 114-1 and a second organization 114-2, among others; the system instance (110-1-1) in the datacenter (112-1) may host a third organization 114-3, among others.

The multitenant computing system may comprise application servers and database servers in system instances for processing query statements that are derived (e.g., by application servers running in the multitenant computing system or the system instance therein, etc.) from user queries generated/originated at user devices 108 (and/or other queries originated elsewhere). These user queries may be received by the application servers operating in conjunction with the database servers. The user queries cause the database servers to retrieve data values (e.g., persistently, etc.) stored in standard and/or custom objects maintained by the system instances for one or more organizations in the plurality of organizations hosted in the multitenant computing system. The retrieved data values may be used to generate query results, which can then be returned to the user devices (108) as responses to the user queries.

2.1 Query Processing

Figure 1B:
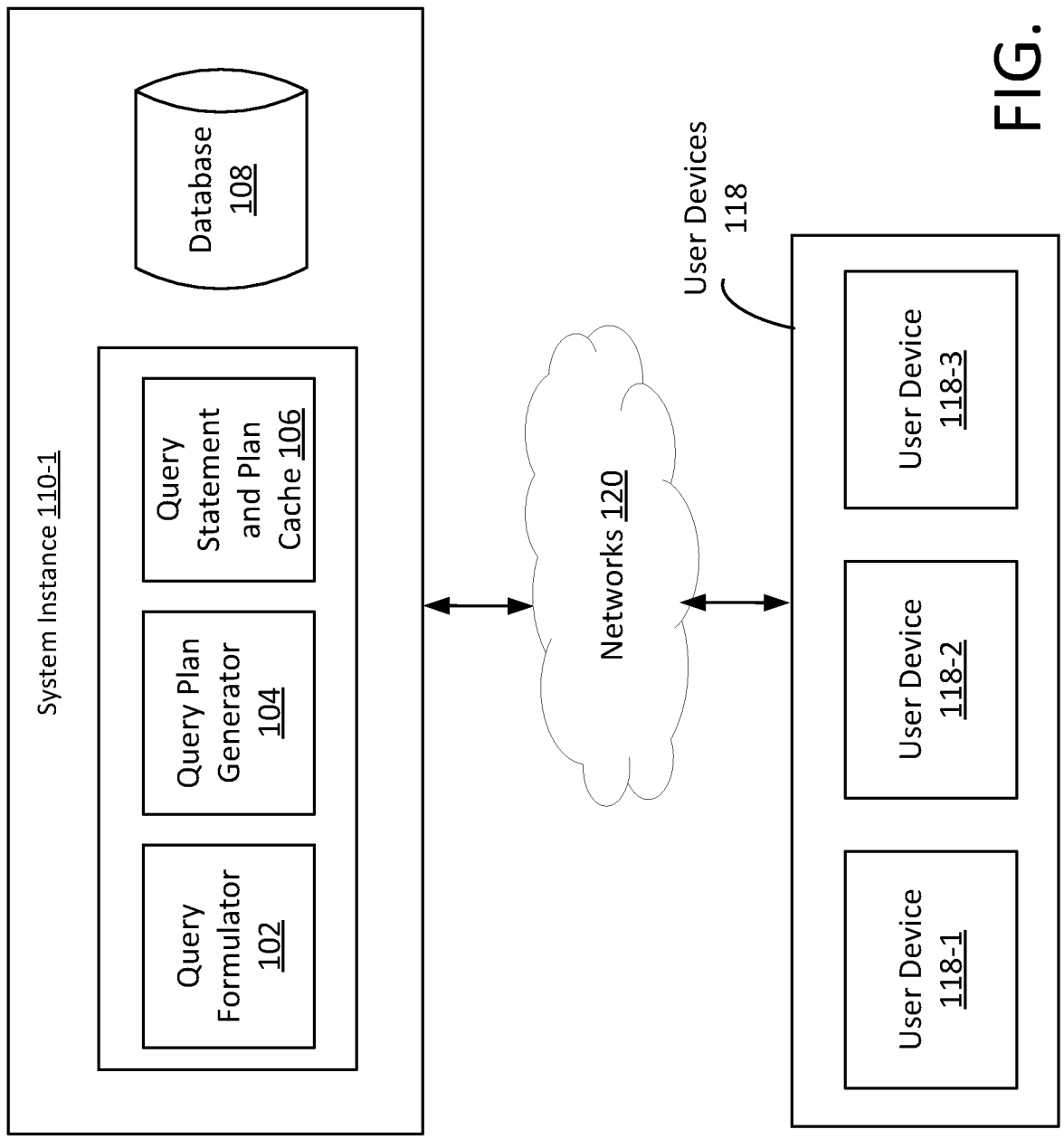
FIG. 1B illustrates an example system configuration for processing user queries.

FIG. 1B illustrates an example system configuration for processing user queries from the user devices (118) and retrieving stored data from a database 108 to be returned to the user devices (118) as query results to the user queries. In some embodiments, a system instance (e.g., 110-1, etc.) may comprise a query formulator 102, a query plan generator 104, a query statement and plan cache 106, etc. Various system constituents as illustrated in FIG. 1B may be implemented through software, hardware, or a combination of software and hardware. Any, some or all of these system constituents may be interconnected and communicated directly, or through one or more networks (e.g., 120, etc.).

In some embodiments, a single server such as a database server, a database engine, and so forth, may implement some or all of the query formulator (102), the query plan generator (104), the query statement and plan cache (106), etc. Additionally, optionally or alternatively, two or more servers such as a database server and an application server operating with the database server, and so forth, may implement some or all of the query formulator (102), the query plan generator (104), the query statement and plan cache (106), etc.

By way of example but not limitation, a database server, or a database engine therein, may store or keep, in the query statement and plan cache (106), a set of (e.g., most, etc.) recently executed query plans and a set of (e.g., most, etc.) recently processed (or precompiled) query statements (or recently processed query statements). Each cached precompiled query statement in the set of recently precompiled query statements in the query statement and plan cache (106) corresponds to a respective (e.g., most, etc.) cached query plan in the set of recently executed query plans in the query statement and plan cache (106). Each such cached query statement in the set of recently precompiled query statements in the query statement and plan cache (106) may be used as a key to look up in, and retrieve, the respective (e.g., most, etc.) cached query plan in the set of (e.g., most, etc.) recently executed query plans from the query statement and plan cache (106).

Additionally, optionally or alternatively, one or more other attendant or temporary database objects, database procedures, etc., used to help carry out the query plans can be stored or kept in the query statement and plan cache (106).

In some embodiments, the database server, or the query plan generator (104) therein, implements a most-recently-used caching method/algorithm (e.g., using one or more ring buffers, etc.) to manage the use of the query statement and plan cache (106).

When the least recently used cached query statement is removed (e.g., displaced out by the most recently used query statement, etc.) from the set of recently precompiled query statements cached in the query statement and plan cache (106) at a given time point, the least recently used cached query plan (corresponding to the least recently used query statement) is also removed (e.g., displaced out by the most recently used query plan, etc.) from the set of recently executed query plans cached in the query statement and plan cache (106) at the same time.

Similarly, when the most recently used cached query statement is added (e.g., by displacing out the least recently used query statement, etc.) into the set of recently precompiled query statements cached in the query statement and plan cache (106) at a given time point, the most recently used cached query plan (corresponding to the most recently used query statement) is also added (e.g., by displacing out the least recently used query plan) from the set of recently executed query plans cached in the query statement and plan cache (106) at the same time.

The database server may process a query statement (e.g., a prepared SQL statement, a dynamic SQL statement, a PL/SQL code portion or procedure, a query statement with runtime dynamic binding of variables/parameters, etc.) in two phases such as a preparation phase and an execution phase. The query statement may be derived from a user query originated from a user device (e.g., 118-1, 118-2 or 118-3, etc.) (or from an application server interacting with the user device). In the first phase or the preparation phase, the database server determines whether a query plan already exists in the query statement and plan cache (106) for the query statement. This may be done, by way of example but not limitation, through a comparison between a first string (or a query tree obtained by query statement parsing) representing the query statement and a second string (or a second query tree obtained by query statement parsing) representing each query statement stored or kept in the query statement and plan cache (106).

If a match is found between the query statement and any of the cached query statements in the query statement and plan cache (106), then it is determined that a query plan for the query statement exists in the query statement and plan cache (106). The query plan cached in the query statement and plan cache (106) may be accessed using the query statement as a key. The database server omits compiling the query statement and proceeds to the second phase or the execution phase for processing the query statement.

On the other hand, if a match is not found between the query statement and any of the cached query statements in the query statement and plan cache (106), then it is determined that a query plan for the query statement does not exist in the query statement and plan cache (106). The database server, or the query plan generator (104) therein, compiles the query statement into a query plan at runtime.

After the query plan is successfully compiled/generated for the query statement, the database server, or a database execution engine therein, proceeds to the second phase or the execution phase for processing the query statement. In the meantime, the query statement and the query plan may be added to the query statement and plan cache (106) as the most recently used query statement and the most recently used query plan.

In the second phase or the execution phase, the database server, or a database execution engine therein, carries out the query plan (e.g., from the cache if found there, compiled at runtime after the user query is received if not found in the cache, etc.) for the query statement to obtain stored data from the database (108) and returns query results as a response to the user query to the user device from which the user query was generated/originated.

In many operational scenarios, based on user pages displayed on, or user actions made by one or more users through, one or more user devices, numerous user queries can be made to the same standard or custom object maintained by the multitenant computing system over time. The standard or custom object may comprise a plurality of data field values for a plurality of data fields. The data field values may be stored in the same (database) table comprising a plurality of (database) columns each of which corresponds to a respective data field in the plurality of data fields of the standard or custom object.

Numerous user queries to the same table may result in different query statements that may not have been created before or that may have been expired from the query statement and plan cache (106). As a result, costly operations such as string concatenation, query statement compilation, query plan generation, query plan optimization, etc., are performed for each of many of these query statements derived from the user queries to the same table, thereby causing the user query to be completed more slowly and causes more computing resources to be used than otherwise.

In addition, each of these numerous query statements and its respective query plan generated at runtime may occupy a respective portion of the query statement and plan cache (106) and thus displace previously compiled query statements and their respective query plans from the query statement and plan cache (106). As the numerous query statements and query plans that access the same table may use up some or all of the query statement and plan cache (106), any newly processed query statement is likely to encounter a cache miss. As a result, the newly received query statement needs a runtime compilation, which severely impacts performance and causes additional computing resources and time to be used, even if the newly processed query statement has been compiled and executed not long ago.

For example, as illustrated in FIG. 2A, a first user query 126-1-1 intended to retrieve first data field values for first data fields of a first standard or custom object may be received by the database server or an application server operating in conjunction with the database server at a first time point. The first data field values for the first data fields of the first standard or custom object may correspond to first column values for a first combination of columns in a first (database) table 124-1 stored in the database (108). The first user query (126-1-1) may be used by the database server to generate a first query statement 116-1-1.

In the preparation phase, the database server may determine that the first query statement (116-1-1) does not exist in the query statement and plan cache (106), which in turn means a query plan for the first query statement (116-1-1)

also does not exist in the query statement and plan cache (106). In response, the database server, or the query plan generator (104) therein, proceeds to compile the first query statement (116-1-1) into a first query (or execution) plan 122-1-1. After the first query plan (122-1-1) is successfully generated, the database server proceeds to carry out the first query plan (122-1-1) and return first query results to a first user device from which the first user query is originated. In the meantime, the first query statement (116-1-1) and the first query plan (122-1-1) may be added to the query statement and plan cache (106) as the most recently used query statement and the most recently used query plan.

At a second time point subsequent to the first time point, a second user query 126-1-2 intended to retrieve second data field values for second data fields of the first standard or custom object may be received by the database server or an application server operating in conjunction with the database server. The second data field values for the second data fields of the first standard or custom object may correspond to second column values for a second combination of columns in the first table (124-1) stored in the database (108). The second user query (126-1-2) may be used by the database server to generate a second query statement (116-1-2), which may have a different string representation (or a different query tree representation) from that of the first query statement (116-1-1), even though both user queries are directed to the same table (124-1).

In the preparation phase, the database server may determine that the second query statement (116-1-2) does not exist in the query statement and plan cache (106) as the second query statement (116-1-2) has a different string representation (or a different query tree representation) from that of the first query statement (116-1-1). This in turn means a query plan for the second query statement (116-1-2) also does not exist in the query statement and plan cache (106). In response, the database server, or the query plan generator (104) therein, proceeds to compile the second query statement (116-1-2) into a second query (or execution) plan 122-1-2. After the second query plan (122-1-2) is successfully generated, the database server proceeds to carry out the second query plan (122-1-2) and return second query results to a second user device from which the second user query is originated. In the meantime, the second query statement (116-1-2) and the second query plan (122-1-2) may be added to the query statement and plan cache (106) as the most recently used query statement and the most recently used query plan.

The foregoing scenarios may also occur or repeated for other tables in the database (108). For example, as illustrated in FIG. 2A, different user queries (e.g., 126-2-1, 126-2-2, etc.) may be directed to a different table (e.g., 124-2, etc.) other than the first table (124-1) in the database (108). These different user queries (e.g., 126-2-1, 126-2-2, etc.) may lead to different query statements (e.g., 116-2-1, 116-2-2, etc.) and different query plans (e.g., 122-2-1, 122-2-2, etc.), even though these user queries are ultimately directed to the same table (e.g., 124-2, etc.), As a result, repeated compilations of query statements are performed at runtime, causing severe performance degradation at runtime. In addition, these query statements and corresponding query plans are considered as different, causing the query statement and plan cached (106) to be exhausted relatively quickly and cached query statements and cached query plans to be displaced, removed or expired relatively quickly. As a result, costly cache misses occur frequently.

Techniques as described herein can be implemented to support high-performance high-efficiency user query processing in a computer system such as a multitenant computing system. Under these techniques, different user queries for different combinations of columns in the same table can be used to derive the same query statement (e.g., the same SQL statement, etc.). A database server, or the query formulator (102) therein, can formulate or reformulate the user queries (which may or may not be query statements in their own right) directed to the same table into the same query statement, for example (e.g., fully, with minimum or no user intervention, etc.) automatically.

Under techniques as described herein, in some embodiments, only a single query statement and only a single corresponding query plan is generated for a table for all user queries that access the same table. Only the very first user query among numerous user queries that access the same table incurs query plan compilation costs (e.g., a time delay, computing resource usages for compiling and generating the query plan, etc.). In addition, since only one query statement and only one corresponding query plan are cached, many tables in the database (108) can have their query statements and corresponding query plans to be stored or kept in the query statement and plan cache (106). This increases probabilities for cache hits and avoids recompiling previously compiled query statements even when some or all of these query statements may have been compiled a relatively long time ago.

Figure 2B:
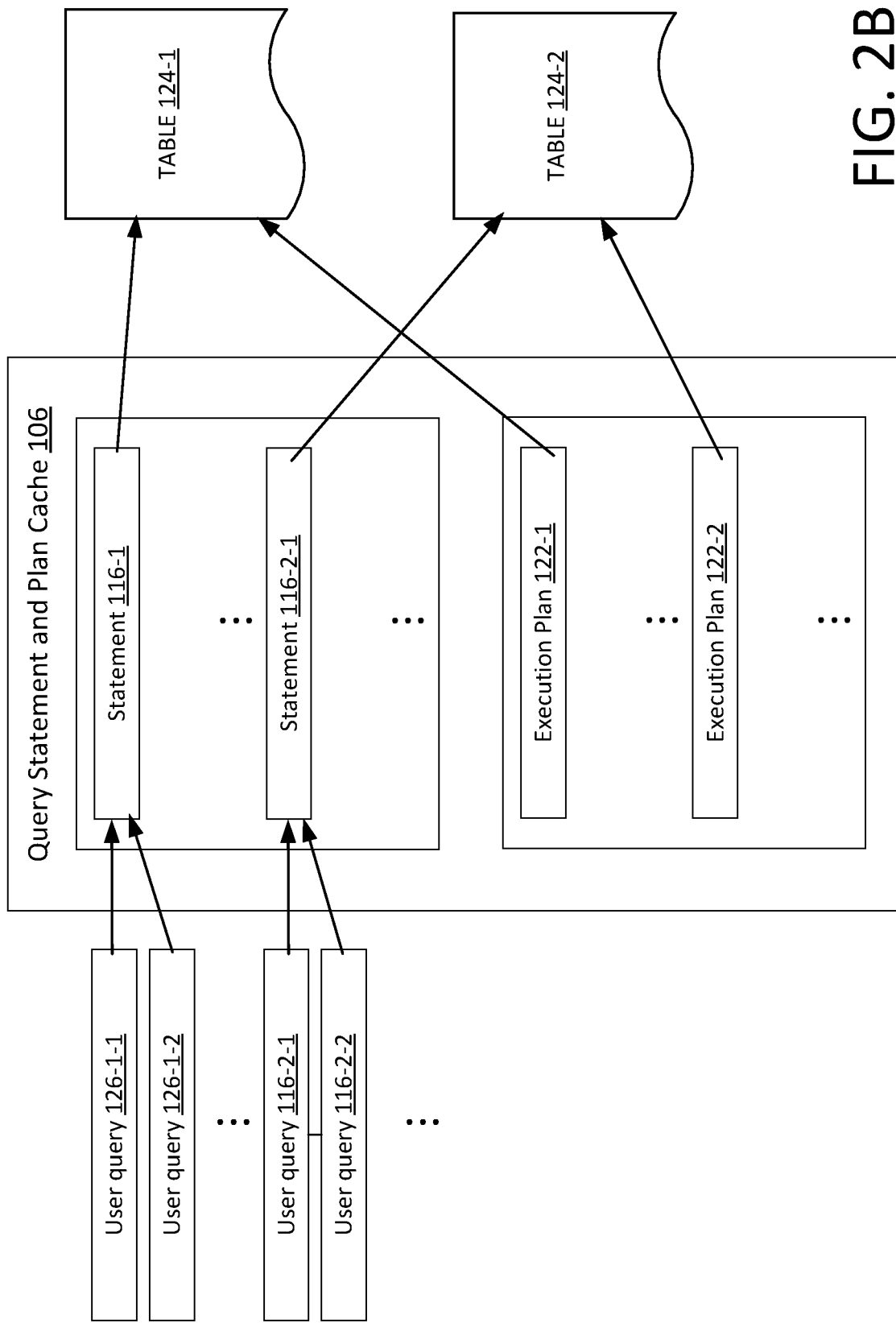

For example, as illustrated in FIG. 2B, under techniques as described herein, in response to receiving the first user query (126-1-1) that is directed to retrieving the first column values for the first combination of columns in the first table (124-1), in the preparation phase, the database server may determine whether a union-all query statement generated from a previous user query directed to retrieving any column values for any combination of columns in the first table (124-1) exists in the query statement and plan cache (106). In response to determining that such a union-all query statement does not exist in the query statement and plan cache (106), the database server accesses table schema information for the first table (124-1) and generate a first union-all query statement 116-1 for the first table (124-1). The first union-all query statement (116-1) comprises tokens (e.g., strings or sub-strings, etc.) representing placeholders to be set dynamically at runtime to contemporaneous values of one or more runtime column selection variables (or one or more runtime parameters).

In addition, the database server uses the first user query (126-1-1) to generate a first set of specific values for the one or more runtime column selection variables. The first set of specific values for the one or more runtime column selection variables is used to selectively identify the first combination of columns in the first table (124-1) for column value retrievals while avoiding identifying columns in the first table (124-1) other than the first combination of columns for column value retrievals.

The database server, or the query plan generator (104) therein, proceeds to compile the first union-all query statement (116-1) into a first union-all query (or execution) plan 122-1. After the first union-all query plan (122-1) is successfully generated, the database server proceeds to carry out the first union-all query plan (122-1) by dynamically binding the one or more runtime column selection variables in the first union-all query statement (116-1) with the first set of specific values and return the first query results to the first user device from which the first user query is originated. In the meantime, the first union-all query statement (116-1) and the first union-all query plan (122-1) may be added to the query statement and plan cache (106) as the most recently used query statement and the most recently used query plan.

At a second time point subsequent to the first time point, in response to receiving the second user query (126-1-2) that is directed to retrieving the second column values for the second combination of columns (different from the first combination of columns) in the first table (124-1), in the preparation phase, the database server may determine whether a union-all query statement generated from a previous user query directed to retrieving any column values for any combination of columns in the first table (124-1) exists in the query statement and plan cache (106). In response to determining that such a union-all query statement exists in the query statement and plan cache (106), the database server omits generating the first union-all query statement (116-1) for the first table (124-1). The same first union-all query statement (116-1) comprising tokens (e.g., strings or sub-strings, etc.) representing placeholders to be set dynamically at runtime to contemporaneous values of the one or more runtime column selection variables in the query statement and plan cache (106) will be used in subsequent processing in connection with the second user query (126-1-2).

In addition, the database server uses the second user query (126-1-2) to generate a second set of specific values for the one or more runtime column selection variables. The second set of specific values for the one or more runtime column selection variables is used to selectively identify the second combination of columns in the first table (124-1) for column value retrievals while avoiding identifying columns in the first table (124-1) other than the second combination of columns for column value retrievals.

The database server, or the query plan generator (104) therein, proceeds to access and re-use the first union-all query plan (122-1) in the query statement and plan cache (106), as the first union-all query plan (122-1) was already generated and cached when the first user query was processed. The database server proceeds to carry out the first union-all query plan (122-1) by dynamically binding the one or more runtime column selection variables in the first union-all query statement (116-1) with the second set of specific values and return the second query results to the second user device from which the second user query is originated. In the meantime, the first union-all query statement (116-1) and the first union-all query plan (122-1) may be updated in the query statement and plan cache (106) as the most recently used query statement and the most recently used query plan.

The foregoing scenarios may also occur or repeated for other tables in the database (108). For example, as illustrated in FIG. 2B, different user queries (e.g., 126-2-1, 126-2-2, etc.) may be directed to a different table (e.g., 124-2, etc.) other than the first table (124-1) in the database (108). These different user queries (e.g., 126-2-1, 126-2-2, etc.) may lead to a single union-all query statement (e.g., 116-2, etc.) and a single union-all query plan (e.g., 122-2, etc.), as these user queries are ultimately directed to the same table (e.g., 124-2, etc.), As a result, repeated compilations of query statements can be avoided to a great extent at runtime, thereby improving performance and response time at runtime. In addition, only a single query statement and a single query plan is generated for each table, thereby allowing the query statement and plan cached (106) to store other union-all query statements and other database operation. As a result, costly cache hits occur frequently under techniques as described herein.

2.2 Example Union all Query Statements

Figure 3B:
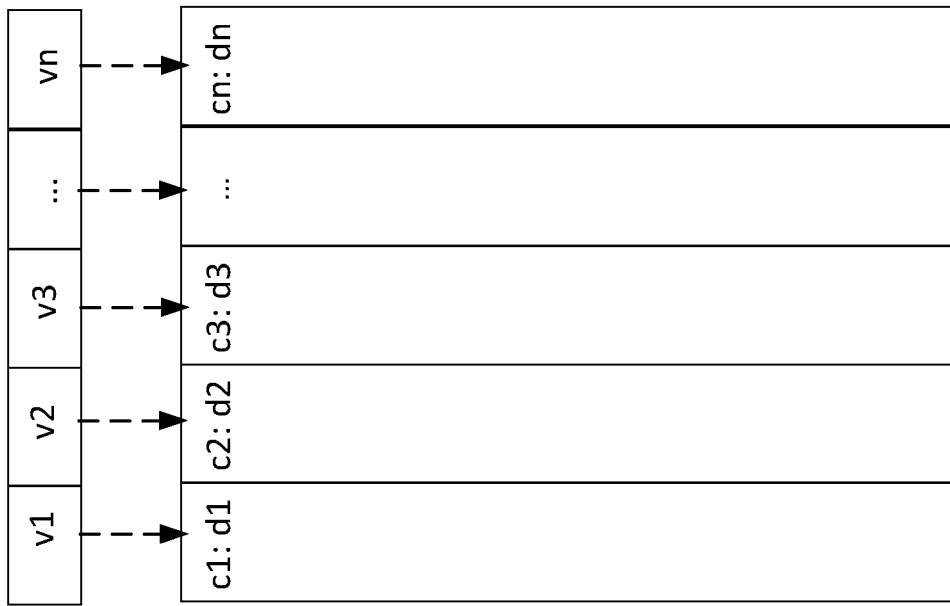
FIG. 3B through FIG. 3D illustrate example named variables/parameters for column selection.
Figure 3A:
FIG. 3A illustrates an example (database) table.

FIG. 3A illustrates an example (database) table 124 (denoted as "tb1") stored in a database (e.g., 108 of FIG. 1B, etc.). The table (124) comprises a plurality of columns c1, c2, c3, ... cn, respectively of data type(s) d1, d2, d3, ... dn. For example, the c1 column may be of a string data type as d1; the c2 column may be of a number data type as d2; the c3 column may be of a datetime data type as d3; and so on.

The table (124) may represent any table (e.g., 124-1 of FIG. 2B, 124-2 of FIG. 2B, etc.) stored in the database and, in some operational scenarios, may be subject to numerous user queries for retrieving column values of a plurality of (e.g., hundreds, etc.) different combinations of columns in the table (124). For example, a first user query may be directed to the c1 and c2 columns in the table (124) for column value retrievals; a second user query may be directed to the c2 and c3 columns in the table (124) for column value retrievals; a third user query may be directed to the c1, c2 and c3 columns in the table (124) for column value retrievals; and so on.

Under other approaches that do not implement techniques as described herein, these different user queries result in different query statements.

Under techniques as described herein, user queries for each table in the database (108) may be processed by way of the same union all query statement. There is no need to rewrite different query statements for all these user queries directed to the same table (124). In a non-limiting example implementation, all user queries directed to the table (124) may be processed by way of a single union all query statement as follows:

SELECT $d1\_2\_T(c1)$ FROM $tb1$ WHERE:$v1$=1
    UNION ALL

SELECT $d2\_2\_T(c2)$ FROM $tb1$ WHERE:$v2$=1
    UNION ALL

SELECT $d3\_2\_T(c3)$ FROM $tb1$ WHERE:$v3$=1
    UNION ALL

SELECT $dn\_2\_T(cn)$ FROM $tb1$ WHERE:$vn$=1    (1-1)

where ":v1", ":v2", ":v3", ... ":vn" denote placeholders, in the union all query statement in expression (1-1) above, to be respectively filled in with a set of specific values for one or more runtime column selection variables/parameters at runtime; "d1_2_T( ... )", "d2_2_T( ... )", "d3_2_T ( ... )", "dn_2_T( ... )" denote data type conversion functions that convert respectively the datatypes d1, d2, d3, ... dn of the columns c1, c2, c3, cn to a common data type T (e.g., a common string value representation, a common binary value representation, strings, numbers, raw binary, blobs, etc.). Without applying these data type conversion functions, different columns may return column values of different data types which cannot be joined together into combined select results by UNION ALL operators.

The common data type T and the data type conversion functions may be selected from among many possible common data type candidates and many possible data type conversion function candidates. In some embodiments, these functions are selected to be those that are not lossy in conversion operations. Additionally, optionally or alternatively, in some embodiments, these functions may be allowed to incur some loss of information in conversion operations provided that the loss of information (e.g., relatively small quantization errors, within a specific tolerance range, within a specific precision, etc.) is acceptable under the application data fetch semantics. In some embodiments, each of the data type conversion functions "d1_2_T( ... )", "d2_2_T( ... )", "d3_2_T( ... )", "dn_2_T( ... )" is selected/defined to convert the data type of a corresponding column into the common data type T with no or negligible loss of information AND each such data type conversion function (e.g., "d1_2_T( ... )", "d2_2_T( ... )", "d3_2_T ( ... )", "dn_2_T( ... )", etc.) has a mathematical inverse function as an inverse data conversion function (e.g., "T_2_d1( ... )", "T_2_d2( ... )", "T_2_d3( ... )", "T_2_dn ( ... )", etc.) to convert the common data type T back to the data type of the corresponding column with no or negligible loss of information. Thus, there exists a pair of data conversion function (e.g., "d1_2_T( ... )" and "T_2_d1( ... )", "d2_2_T( ... )" and "T_2_d2( ... )", "d3_2_T( ... )" and "T_2_d3( ... )", "dn_2_T( ... )" and "T_2_dn( ... )", etc.) for each column in the plurality of columns c1, c2, c3, cn in the table (124).

In some embodiments, the plurality of columns c1, c2, c3, ... cn may represent all columns in the table (124). In some other embodiments, the plurality of columns c1, c2, c3, ... cn may represent a proper subset in all columns in the table (124); for example, the proper subset may represent all those columns in the table (124) that are subject to user queries.

As can be seen in expression (1-1) above, the union all query statement is constituted by unions of a plurality of single column select statements (or query components) for all columns in the plurality of columns c1, c2, c3, ... cn. Furthermore, each (e.g., i-th, etc.) single column select statement (or query component) in the plurality of single column select statements comprises a corresponding (column selection) predicate in the form of ":i=1," where i denotes 1, 2, 3, ... n.

At runtime, the union all query statement is capable of returning query results for any combination in all distinct combinations of columns in the plurality of columns c1, c2, c3, ... cn.

More specifically, whether query results (e.g., single column row values, etc.) for a specific column in the plurality of columns c1, c2, c3, ... cn are returned (in a specific combination of columns in all the distinct combinations of columns in the plurality of columns c1, c2, c3, ... cn) can be controlled by one or more corresponding (column selection) predicates (e.g., conjunctive predicates, etc.) in a single column query statement (or query component) for each such column in the union all query statement as shown in expression (1-1).

When the corresponding (column selection) predicates are evaluated to TRUE or 1, the query results for the specific column in the plurality of columns c1, c2, c3, ... cn are returned. On the other hand, when the corresponding (column selection) predicates are evaluated to FALSE or 0, the query results for the specific column in the plurality of columns c1, c2, c3, ... cn are not returned.

In some embodiments, the one or more runtime column selection variables/parameters comprise a set of named variables/parameters such as v1, v2, v3, ... vn, as illustrated in FIG. 3B, respectively (one-to-one) for the placeholders ":v1", ":v2", ":v3", ... ":vn" in the union all query statement in expression (1-1) above. In some embodiments, each named variable/parameter vi, where i is an integer between one (1-1) and n, in the set of named variables/parameters may be set to a specific Boolean value (e.g., TRUE or FALSE, 1 or 0, etc.) depending on whether a respective column ci to which each such named variable/parameter vi corresponds is to be selected for column value retrieval. If the respective column ci is to be selected for column value retrieval, then the named variable/parameter vi is set to TRUE or 1. Otherwise, if the respective column c2 is not to be selected for column value retrieval, then the named variable/parameter vi is set to FALSE or 0.

The set of specific (e.g., Boolean, etc.) values for the set of named variables/parameters v1, v2, v3, ... vn may be generated at runtime based on what specific combination of columns in the table (124) to which a user query is directed, and then used to populate or fill in the placeholders ":v1", ":v2", ":v3", ... ":vn" in the union all query statement in expression (1-1) above at runtime. As a result, query results based on column values retrieved for the specific combination of columns in the table (124) to which the user query is directed can be returned as a response to the user query.

Figure 3D:
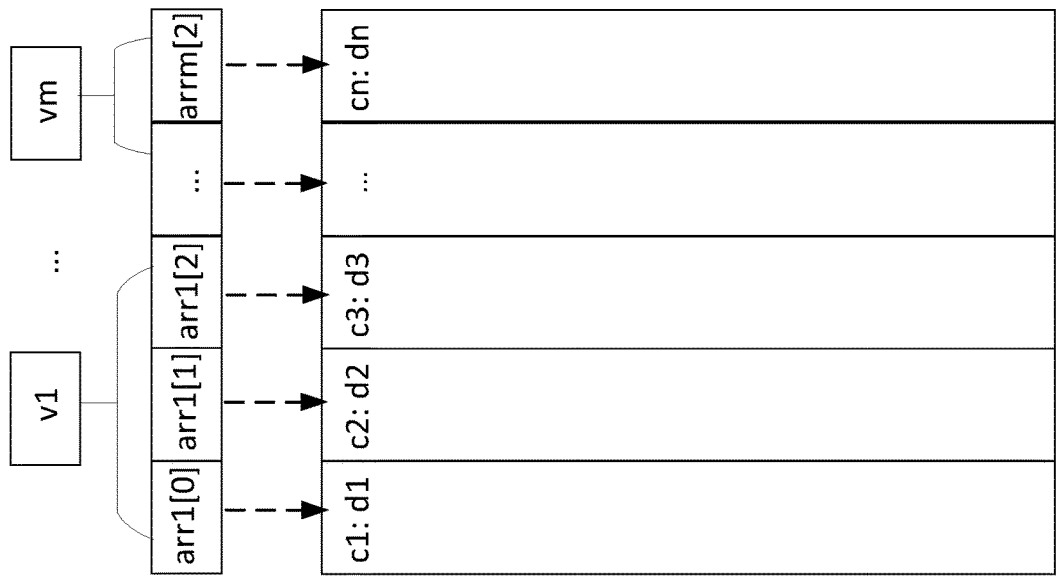
Figure 3C:
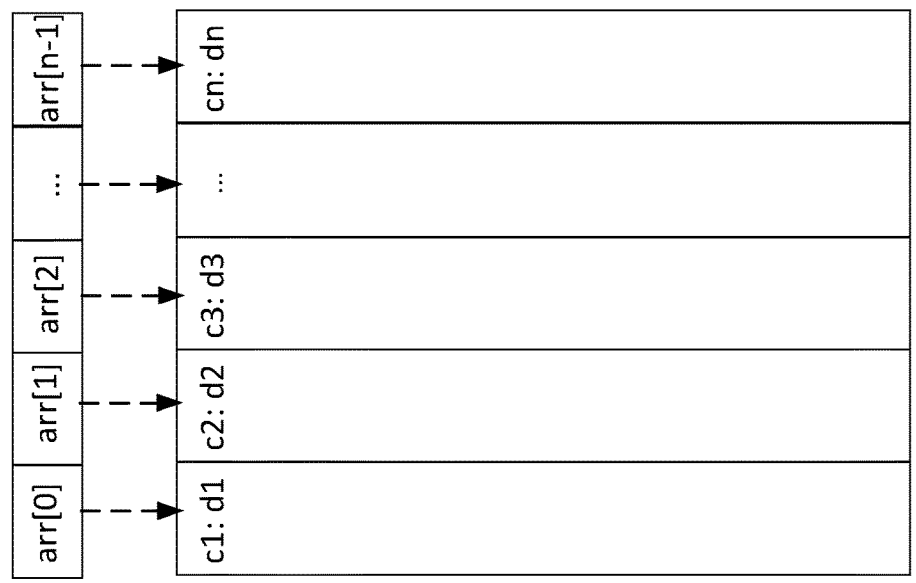

In some embodiments, the one or more runtime column selection variables/parameters comprise a (e.g., single) array variable/parameter (denoted as "arr") that comprises (e.g., not separately named, implicitly named with "arr", etc.) array elements "arr[0]", "arr[1]", "arr[2]", ... "arr[n−1]", as illustrated in FIG. 3C, respectively (one-to-one) for placeholders ":arr[0]", ":arr[1]", ":arr[2]", ... ":arr[n−1]" in another union all query statement as follows:

SELECT $d1\_2\_T(c1)$ FROM $tb1$ WHERE:arr[0]=1
  UNION ALL

SELECT $d2\_2\_T(c2)$ FROM $tb1$ WHERE:arr[1]=1
  UNION ALL

SELECT $d3\_2\_T(c3)$ FROM $tb1$ WHERE:arr[2]=1
  UNION ALL

SELECT $dn\_2\_T(cn)$ FROM $tb1$ WHERE:arr[n−1]
  =1                                                (1-2)

In some embodiments, each array element (e.g., arr[i], where i is an integer between 0 and n−1, etc.) in the array variable/parameter "arr" may be a Boolean value (e.g., TRUE or FALSE, 1 or 0, etc.). The set of specific (e.g., Boolean, etc.) values for the array elements "arr[0]", "arr[1]", "arr[2]", ... "arr[n−1]" in the named variables/parameter "arr" may be generated at runtime based on what specific combination of columns in the table (124) to which a user query is directed, and then used to populate or fill in the placeholders ":arr[0]", ":arr[1]", ":arr[2]", ... ":arr[n−1]" in the union all query statement in expression (1-2) above at runtime. As a result, query results based on column values retrieved for the specific combination of columns in the table (124) to which the user query is directed can be returned as a response to the user query.

In some embodiments, user queries for each table in the database (108) may be processed by way of the same union all query statement as follows:

SELECT $d1\_2\_T(c1)$ FROM $tb1$ WHERE:v1=1
  AND:arr1[0]=1 UNION ALL

SELECT $d2\_2\_T(c2)$ FROM $tb1$ WHERE:v1=1
  AND:arr1=1 UNION ALL

SELECT $d3\_2\_T(c3)$ FROM $tb1$ WHERE:v1=1
  AND:arr1[2]=1 UNION ALL

SELECT $dn\_2\_T(cn)$ FROM $tb1$ WHERE:vm=1
  AND:arrm(2)=1                                      (2)

where ":v1", ... ":vm", ... ":arr1[0]", ":arr1[1]", ... ":arr1[2]", ":arrm[2]" denote placeholders, in the union all query statement in expression (2) above, to be respectively dynamically filled in with a set of specific values for one or more runtime column selection variables/parameters at runtime. As shown in expression (2) above, for each column in the table (124) such as the c1 column, two (e.g., conjunctive, etc.) column selection predicates are used to control whether column values for each such column (the c1 column in the present example) are to be retrieved. If both of the column selection predicates for the column are evaluated to TRUE or 1, then the column is selected for column value retrievals. On the other hand, if either of the column selection predicates for the column is evaluated to FALSE or 0, then the column is not selected for column value retrievals.

In some embodiments, the one or more runtime column selection variables/parameters comprise a set of named group variables/parameters such as v1, v2, v3, . . . vm for controlling access to a column group, and one or more array variables/parameters (denoted as "arr1", "arr2" (not shown), "arr3" (not shown), . . . "arrm") for controlling access to individual columns in a column group, where m<=n, as illustrated in FIG. 3D.

By way of example but not limitation, a first column group in m column groups may consist of the c1, c2 and c3 columns with a placeholder ":v1" and additional three placeholders ":arr1[0]", ":arr1[1]" and ":arr1[2]" in the union all query statement in expression (2) above. The placeholder ":v1" in the first column group can be set to a respective named group variable/parameter "v1" in the set of named group variables/parameters v1, v2, v3, . . . vm.

If it is determined at runtime that query results of any column (any of the c1, c2 or c3 column) to which the placeholder ":v1" in the first group corresponds are to be returned, then the specific value for the respective named group variable/parameter "v1" to populate the placeholder ":v1" is set to TRUE or 1. On the other hand, if it is determined at runtime that query results of all columns (all of the c1, c2 and c3 columns) to which the placeholder ":v1" in the first group corresponds are NOT to be returned, then the specific value for the respective named group variable/parameter "v1" to populate the placeholder ":v1" is set to FALSE or 0.

As a result, the specific (e.g., Boolean value, TRUE or 1, FALSE or 0, etc.) value for the respective named group variable/parameter "v1" to populate the placeholder ":v1" may be used to collectively and efficiently guard—which amounts to a hint to be exploited by a query optimizer to use relatively fast evaluation of group Boolean values and to omit relatively slow evaluation of (e.g., array-based, etc.) values, etc.—access to all columns related to the placeholder in the first column group either for retrieval or for non-retrieval.

Thus, once a named group variable/parameter vi, where i is an integer between 1 and m, is FALSE or 0, then all columns in the respective column group to which the named group variable/parameter vi controls access can be skipped for column value retrievals. On the other hand, even if the named group variable/parameter vi is TRUE or 1, individual columns in the respective column group to which the named group variable/parameter vi controls access may or may not be individually selected for column value retrievals. Under techniques as described herein, whether an individual column in the respective column group is selected for column value retrieval can further depend on additional filtering based on second predicates involving the additional placeholders ": arr1[0]", ": arr1[1]", ":arr1 [2]", . . . ":arrm[2]".

In the present example, the first column group comprises the three additional placeholders ":arr1[0]", ":arr1[1]" and ":arr1[2]" in the union all query statement in expression (2) above. These additional placeholders correspond to, or are set by values in, a respective named array variable/parameter "arr1" in the one or more named array variables/parameters "arr1", "arr2", "arr3", "arrm". The respective named array variable/parameter "arr1" may consist of three array elements arr1[0], arr1[1] and [arr1[2] respectively (one-to-one) for the three additional placeholders ":arr1[0]", ":arr1[1]" and ":arr1[2]" in the union all query statement in expression (2) above. The named array variables/parameter "arr1" is used to hold positional or column-specific selection control values (or array element values) for the c1, c2 and c3 columns in the first column group to populate or fill in the three additional placeholders relating to these columns in the first column group. Thus, depending on how the individual array element values in the named array variables/parameter "arr1" are individually set, individual accesses to the c1, c2 and c3 columns can be controlled.

More specifically, array element values individually determined at runtime for array elements arr1[0], arr1[1] and [arr1[2] of the named array variable/parameter "arr1" is used to populate or fill in the three additional placeholders ":arr1[0]", ":arr1[1]" and ":arr1[2]". In some embodiments, if it is determined at runtime that query results of any column to which any of the placeholders ":arr1[0]", ":arr1 [1]" and ":arr1[2]" corresponds are to be returned, then the array element value for the respective array element (which is one of array elements arr1[0], arr1[1] and [arr1[2]) in the named array variable/parameter "arr1" is set to TRUE or 1; otherwise, the array element value for the respective array element (which is one of array elements arr1[0], arr1[1] and [arr1[2]) in the named array variable/parameter "arr1" is set to FALSE or 0.

Thus, by setting group and array element (e.g., positional, etc.) values to the named group variables/parameters v1, v2, v3, . . . vm and array elements in the one or more named array variables/parameters "arr1", "arr2", "arr3", . . . "arrm", the same query results as those obtained by way of the union all query statement in expressions (1-1) and (1-2) above can be obtained by way of the union all query statement in expression (2) above. In some embodiments, the combination of named non-array variables/parameters and named array variables/parameters can be used to reduce an overall (or total) number of named variables/parameters to be used in dynamic selection at runtime, as a large number of column selections/identifications for column value retrieval in the table (124) can be made at runtime through (e.g., not separately named, implicitly named, etc.) array elements by array indexing/addressing. These techniques may be easily scaled up to handle a table that comprises numerous columns (e.g., 500 columns, 800+ columns, 1000+ columns, etc.) without using a huge total number of named variables (which may present some challenges in passing variable/parameter values to the database procedure executing the union all query statement, in passing runtime values of the variables/parameters to the union all query statement, etc.).

For the purpose of illustration, a union all query statement comprising select statements of single columns may be used to select individual columns of a database table. It should be noted that, in various embodiments, a union all query statement comprising select statements of single columns and/or multiple columns may be used to select zero or more columns individually and/or zero or more groups of multiple columns. That is, in addition to being capable of selecting individual columns on a per-column basis, a union all query statement as described herein is capable of selecting groups of two, three, four, or even more columns, on a per-column-group basis.

For example, at least some user queries for a table in the database (108) may be processed by way of a union all query statement as follows:

SELECT $d1\_2\_T(c1)$FROM $tb1$WHERE:$v1$=1
UNION ALL

SELECT $d2\_2\_T(c2)$FROM $tb1$WHERE:$v1$=1
UNION ALL

SELECT $d3\_2\_T(c3)$FROM $tb1$WHERE:$v1$=1
UNION ALL

. . .

SELECT $dn\_2\_T(cn)$FROM $tb1$WHERE:$vm$=1     (3)

where ":v1", . . . ":vm" denote placeholders, in the union all query statement in expression (3) above, to be respectively dynamically filled in with a set of specific values for one or more runtime column selection variables/parameters at runtime. If a column selection predicate for a column is evaluated to TRUE or 1, then the column is selected for column value retrievals. On the other hand, if the column selection predicate for the column is evaluated to FALSE or 0, then the column is not selected for column value retrievals.

In some embodiments, the one or more runtime column selection variables/parameters comprise a set of named group variables/parameters such as v1, v2, v3, . . . vm for controlling access to a column group, which may consist of a single column, or multiple (e.g., 2, 3, 4, etc.) columns.

It should be noted that, in various embodiments, these and other ways of using one or more named variables/parameters with sets of specific (e.g., Boolean, etc.) values determined at runtime to dynamically populate or fill in (variable/parameter) placeholders in the same union all query statement may be applied to identify or select specific combinations of columns in a table for numerous different user queries that are directed to the same table.

2.3 Parsing Select Results from Union all Query Statements

A union all query statement such as illustrated in expressions (1-1), (1-2) and (2) returns all column values—which are select results (e.g., a single array with array elements of the same common data type T, etc.) of all union all query components (or single column query statements) in the union all query statement with column selection predicates evaluated to TRUE or 1—of all selected columns in a table in the common data type T. To distinguish between first column values of a first selected column in the table with second column values of a second selected column in the table in all the column values returned from the union all query statement, a special marker (e.g., a specific constant value, a specific reserve value, etc.) may be placed between column values (select results) of any two adjacent union all query components (or single column query statements) in the union all query statement, for example by rewriting the union all query statement as illustrated in expression (1-1) above, as follows:

SELECT $d1\_2\_T(c1)$FROM $tb1$WHERE:$v1$=1
UNION ALL

SELECT special_marker UNION ALL

SELECT $d2\_2\_T(c2)$FROM $tb1$WHERE:$v2$=1
UNION ALL

SELECT special_marker UNION ALL

SELECT $d3\_2\_T(c3)$FROM $tb1$WHERE:$v3$=1
UNION ALL

. . .

SELECT special_marker UNION ALL

SELECT $dn\_2\_T(cn)$FROM $tb1$WHERE:$vn$=1     (4)

where "special_marker" denotes the special marker, which may be a constant string/bytes value that lies outside the domain of possible values for any of ci such as c1, c2, c3, etc. In a non-limiting example, the special marker may be a bytes value such as "FFFFFFFFFFFFFFFF". It should be noted that this is for illustration purposes only. In various embodiments, any in a wide variety of special markers in the string representation or in a non-string representation may be used to separate between column values (select results) of any two adjacent union all query components (or single column query statements) in the union all query statement. It should also be noted that the union all query statement in expression (2) above may be similarly rewritten to separate column values (select results) of any two adjacent union all query components (or single column query statements) in the union all query statement.

The special marks embedded in the combined select results of the union all query statement may be used by a database server or an application server to detect boundaries between, or to correctly navigate to, select results of different selected columns in the table; divide combined column values (represented in the common data type T) from the union all query statement to separate column values (represented in the common data type T) for each selected column in the table; to apply a corresponding inverse data conversion to translate the separate column values (represented in the common data type T) for each such selected column into separate column values (represented in an original data type in the database (108)) for each such selected column; to return the separate column values (represented in the original data type in the database (108)) for each such selected column as query results to a user query that is directed to the table; etc.

In some embodiments, instead of or in addition to using special marks in a union all query components, a row count per selected column can be obtained as a row count of select results of a column (e.g., a selected column for column value retrieval, etc.) in the table, for example by rewriting the union all query statement in expression (1-1) above as follows:

SELECT $count\_2\_T(COUNT(x))$FROM $tb1$UNION ALL

SELECT $d1\_2\_T(c1)$FROM $tb1$WHERE:$v1$=1
UNION ALL

SELECT $d2\_2\_T(c2)$FROM $tb1$WHERE:$v2$=1
UNION ALL

SELECT $d3\_2\_T(c3)$FROM $tb1$WHERE:$v3$=1
UNION ALL

. . .

SELECT $dn\_2\_T(cn)$FROM $tb1$WHERE:$vn$=1     (5)

where "count_2_T( . . . )" denotes a data conversion function that converts the data type of the built-in function "COUNT ( . . . )" to the common data type T; x=1 or 2 or 3 or 'abc' or any constant value. That is, a count of how many times a constant is seen is same as the number of rows. In some embodiments, COUNT(pk), where pk denotes a primary key of the table "tb1", may be used in place of COUNT(x). Since the primary key cannot be null, a count of the primary key values is the same as the number of rows. In addition, it should also be noted that the union all query statement in expression (2) above may be similarly rewritten to obtain a row count per selected column as a row count of select results of a column (e.g., a selected column, etc.) in the table.

The row count per selected column may be used by a database server or an application server to divide combined column values (represented in the common data type T) from the union all query statement to separate column values (represented in the common data type T) for each selected column in the table; to apply a corresponding inverse data conversion to translate the separate column values (represented in the common data type T) for each such selected column into separate column values (represented in an original data type in the database (108)) for each such selected column; to return the separate column values (represented in the original data type in the database (108)) for each such selected column as query results to a user query that is directed to the table; etc.

Thus, under techniques as described herein, query code (e.g., in a database procedure, database query logic supporting an API call, etc.) implemented by a database server or an application server can use one or more in a variety of column-to-row translation methods to process and translate combined select results (which combine all column values after column values in original data types represented in the database (108) of a union all query statement as described herein to separate column values for each selected column of a table in an original data type as represented in the database (108), which may then be used to generate specific query results as a response to a specific user query directed to the table.

For example, based on either or both of a special mark or a row count per selected column, the query code can implement an iterative (or recursive) process that reads the combined select results (e.g., in an array form, etc.) of all selected single query components (or all single column query statements with column selection predicates evaluated to TRUE or 1) generated by execution of the union all query statement, perform an equivalent of skin the next n rows (or take the next n rows of column values) off from the combined selected results, map the next n rows to the next selected column (starting from the first selected column), apply an inverse or reverse data type conversion to each of the column values in the next n rows skinned from the combined select results to convert these column values into column values of an original data type represented in the database (108).

In some embodiments, instead of returning select results of a union all query statement in a single array, a pivot operation can be applied for separate select results of each component query (or each single column query statement in the union all query statement with column selection predicates evaluated to TRUE or 1), thereby converting the separate select result of each such component query to a single row with the total number of columns in the single row (after the pivot operation) after the pivot operation equal to the total number of rows in the sepa\rate select result of each such component query before the pivot operation. Query code can then read each row from pivoted select results and transform each such row to its original tabular form (before the pivot operation) after applying an inverse or reverse data type conversion.

For the purpose of illustration only, a union all query statement generalized to handle user queries directed to different combinations of a table is represented by a base query. It should be noted that, in various embodiments, a union all query statement as described herein may comprise other constructs such as one or more of: predicates (e.g., for row selection, not for column selection, etc.), "GROUP BY" and/or "ORDER BY" clauses, subqueries, nested queries, database views, temporary database table, in-memory database table, optimization engine hints, etc. For example, a specific union all query statement as described herein directed to a table may be concatenated with additional predicates that are not for column selection. In some embodiments, the specific union all query statement may be used to process most frequently performed and/or most performance-critical user queries. Such a specific union all query statement may be cached as a precompiled query statement along with a corresponding query plan instead of, or in addition to, a more general (e.g., base, with fewer predicates, etc.) union all query statement directed to the same table and a corresponding more general query plan cached.

For the purpose of illustration only, it has been described that a union all query statement for a table can be used to process user queries directed to the table. It should be noted that, in various embodiments, the union all query statement for the table may be used to process other queries other than user queries originated from user devices. For example, in some embodiments, the union all query statement for the table may be used to process a query originated from a trigger, a system entity, a server, etc., rather than originated from a user device.

3.0 EXAMPLE EMBODIMENTS

Figure 4A:
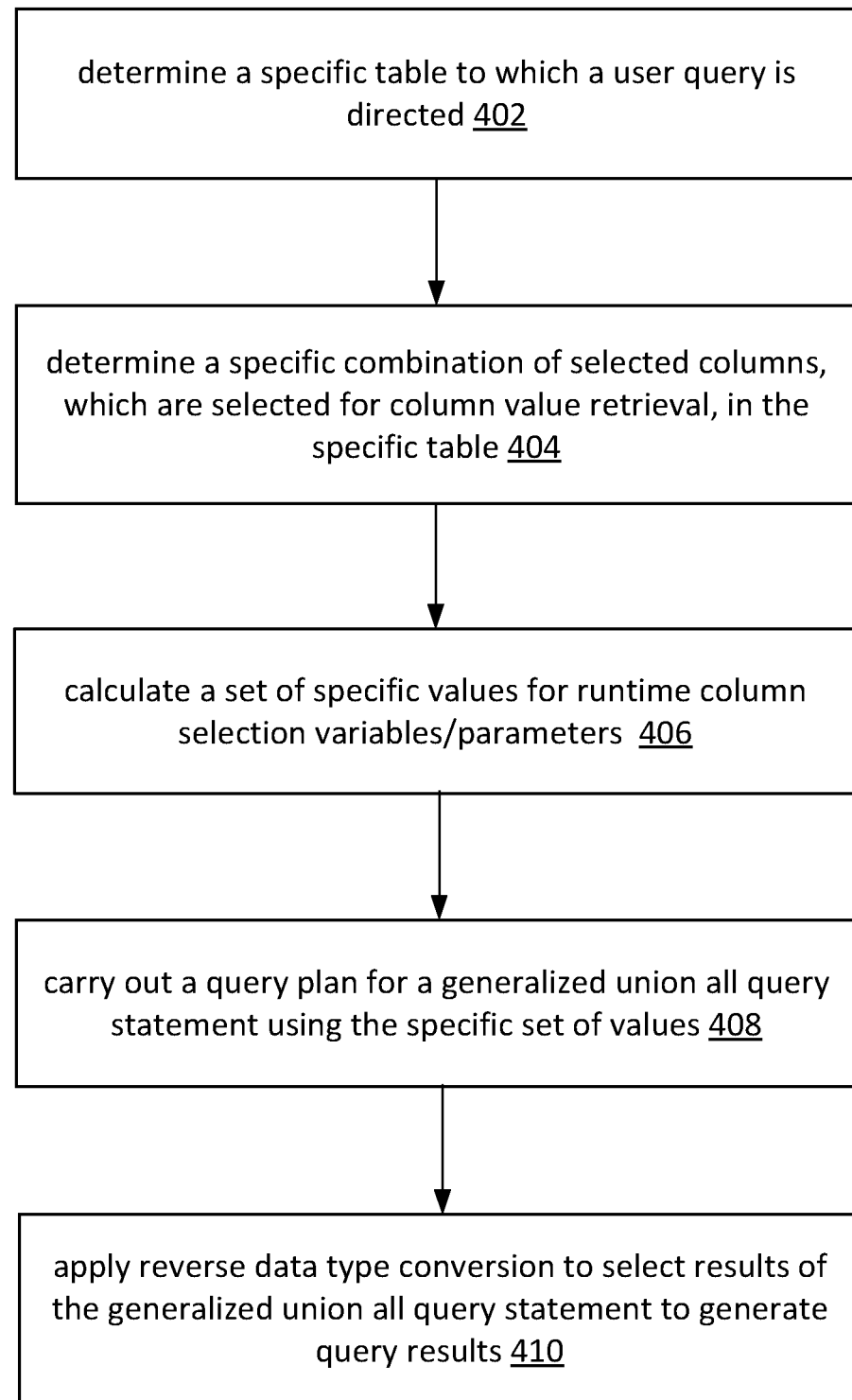
FIG. 4A and FIG. 4B illustrate example process flows.

FIG. 4A illustrates an example process flow that may be implemented by one or more computing devices such as a query processing system comprising a database server, an application server, a combination of database and application servers, etc., as described herein. In block 402, the query processing system determines a specific table to which a user query is directed. This determination may be made, for example, based on a standard or custom object—which corresponds to the table in the database (108)—identified in the user query.

In block 404, the query processing system determines a specific combination of selected columns, which are selected for column value retrieval, in the specific table. In some embodiments, the specific combination of columns may be generated based on user-query-related metadata such as a column list signaled in an API call (e.g., to a database server, to an application server, etc.), and may comprise a specific combination of (TRUE or 1) Boolean values correspond to the specific combination of selected columns. In some embodiments, all selected and non-selected columns in the specific table may be represented by a column selection (e.g., Boolean, binary, etc.) value combination in any of: an array of Boolean values, a bit vector, etc. Such a specific value combination in the array, the bit vector, etc., may be passed in the API call. In some embodiments, the column selection value combination uses the Boolean value of TRUE or 1 to indicate/identify a selected column in the table, and uses the Boolean value of FALSE or 0 to indicate/identify a non-selected column in the table.

In block 406, the query processing system calculates, based on the specific set of selected columns in the table, a set of specific values for one or more runtime column selection variables/parameters. The set of specific values for the one or more runtime column selection variables/parameters are to be used to populate or fill in (variable/parameter) placeholders in a (generalized) union all query statement for the table through dynamic binding. This union all query statement may be used to process numerous different user queries with different combinations of selected columns in the table. This generalized union all query statement may be held or executed in a database procedure (e.g., a PL/SQL procedure, etc.).

It should be noted that, in various embodiments, any in a variety of different possible database procedures may be used to hold or execute a union all query statement as described herein. In an example, the generalized union all query statement may be executed in one or more Type 1 database procedures (possibly comprising multiple subtype database procedures, for example based on whether special markers, what types of special marks, whether row count per selected column, etc., is/are used) that do not involve/implement pivot operations and that return all select results of selected columns in the table in an array. In another example, the generalized union all query statement may be executed in one or more Type 2 database procedures that involve/implement pivot operations and return separate select results of different selected columns in the table in different rows.

In block 408, the query processing system invokes a corresponding database procedure that holds the generalized union all query statement and carries out a query plan for the generalized union all query statement using the specific set of values for the one or more runtime column selection variables/parameters to populate or fill in the column selection placeholders in the generalized union all query statement. If the generalized union all query statement is already cached in a query statement and plan cache as described herein, then the compilation of the generalized union all query statement is avoided for the specific user query; the query plan in the cache can be directly used to bind with the specific set of values for the one or more runtime column selection variables/parameters (e.g., through a "USING" clause in the invoked procedure, etc.).

In block 410, the query processing system applies inverse or reverse data type conversions and/or row-to-column translations and/or column-to-row translations and/or pivot operations as appropriate to the select results of the generalized union all query statement and generate query results to be returned as a response to the user query. Some or all of these operations may be implemented as a part of the invoked database procedure or outside the invoked database procedure.

In some embodiments, the invoked database procedure (without pivot operations) containing the generalized union all query statement, when executed or carried by a database execution engine, returns an array of single elements each of which is a value (array element value) represented in a common data type T. Special markers and/or a row count per selected column may be used to navigate the array returned by the database procedure. Each array element value in the array in the common data type T may be applied with a specific inverse or reverse data type conversion function (corresponding to a specific data type conversion function that converted an original database-stored value in an original data type to the array element value in the common data type T) to obtain the original database-stored value in the original data type subject to any quantization or coding errors introduced by the data type conversion function and/or the inverse or reverse data type conversion function.

In some embodiments, the invoked database procedure (with pivot operations) containing the generalized union all query statement, when executed or carried by a database execution engine, returns an array of single rows. Each single row in the array of single rows corresponds to a respective selected column of the table among all the selected columns of the table. A column value in each such single row stores a value of the respective selected column as represented in a common data type T, and can be applied with a specific inverse or reverse data type conversion function (corresponding to a specific data type conversion function that converted an original database-stored value in an original data type to the array element value in the common data type T) to obtain the original database-stored value in the original data type subject to any quantization or coding errors introduced by the data type conversion function and/or the inverse or reverse data type conversion function.

For example, consider a scenario in which the c1, c2 and c3 columns of the table are respectively a string data type, a number type and a datetime type in the database (108). Specific data conversion functions may be specified by way of the generalized union all query statement to convert selected results from these columns of different data types in the database (108) to a common data type T such as a raw binary data type. This can be determined by the database server or the application server based on database schema information for the table (e.g., from a system table, from a catalog table, etc.). Thus, correct data conversion functions can be selected for each of the c1, c2 and c3 columns of the table based on the data types in the database (108) determined from the schema information. These data conversion functions may be specified in the generalized union all query statement. Likewise, correct inverse or reverse data conversion functions (corresponding to the correct data conversion functions) can be selected for each of the c1, c2 and c3 columns of the table based on the data types in the database (108) determined from the schema information. These inverse or reverse data conversion functions may be used by the invoked database procedure or query code outside the invoked database procedure to process and convert select results returned from the generalized union all query statement to query results that comprise original data values in the original data types such as string, number and datetime for the selected columns such as the c1, c2 and c3 columns of the table.

Figure 4B:
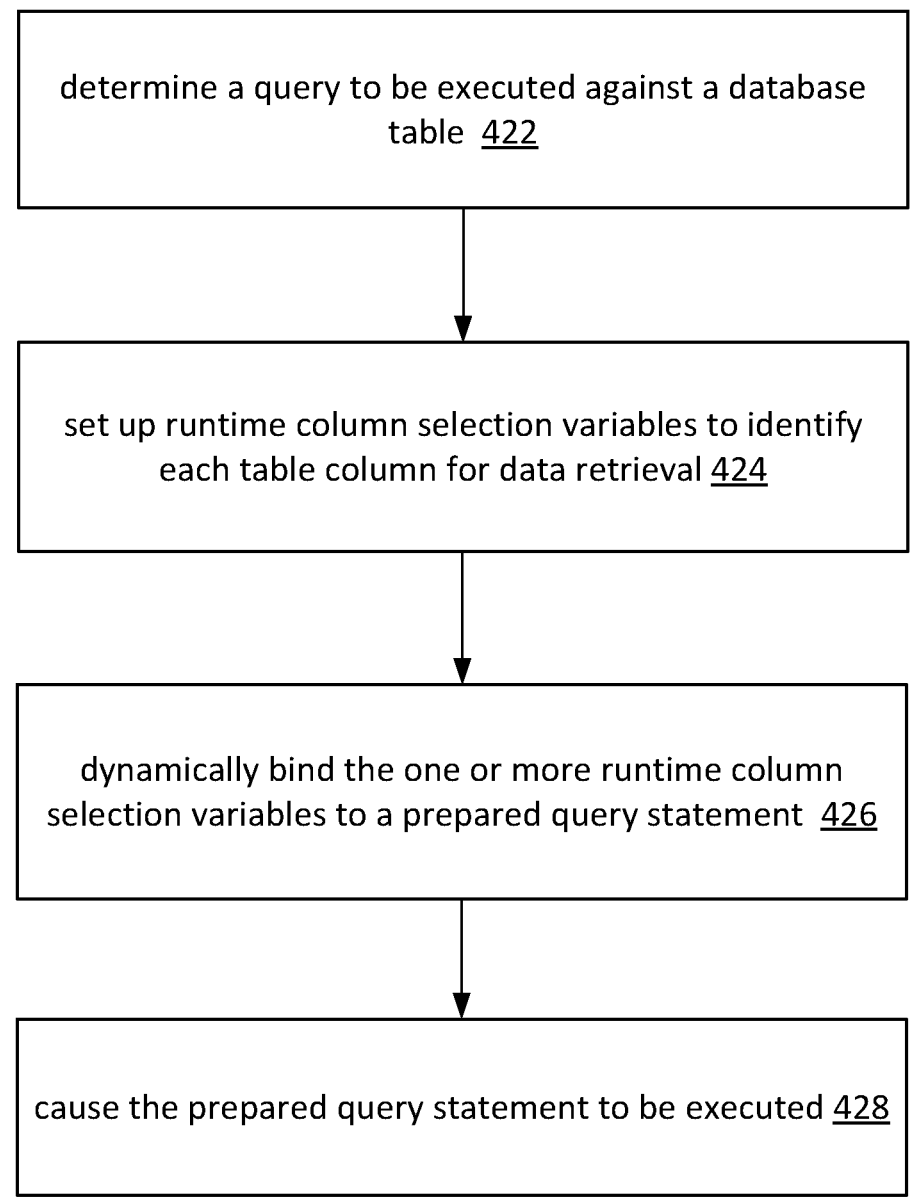

FIG. 4B illustrates an example process flow that may be implemented by one or more computing devices such as a query processing system comprising a database server, an application server, a combination of database and application servers, etc., as described herein. In block 422, the query processing system determines a query to be directed to a database table that comprises a plurality of table columns. The query is used to retrieve database values for a first subset of one or more table columns in the plurality of table columns. The plurality of table columns includes a second subset of one or more table columns from which no database values are to be retrieved for the query.

In block 424, the query processing system sets up one or more runtime column selection variables to identify each table column in the first subset of table columns for data retrieval and to identify each table column in the second subset of table columns not for data retrieval.

In block 426, the query processing system dynamically binds the one or more runtime column selection variables to a prepared query statement. The prepared query statement comprises a plurality of single-column query statements joined by one or more interstitial union operators.

Each single-column query statement in the plurality of single-column query statements joined by one or more interstitial union operators in the prepared query statement specifies a single-column query directed to a corresponding table column in the plurality of table columns with a corresponding predicate. The corresponding predicate in each such single-column query statement is to be bound at runtime dynamically with a corresponding portion of the one or more runtime column selection variables and is evaluated to be true or false in dependence on whether the corresponding table column in each such single-column query statement is in the first subset of table columns or in the second subset of table columns.

In block 428, the query processing system causes the prepared query statement to be executed to retrieve the database values for the first subset of table columns in the database table.

In an embodiment, the one or more runtime column selection variables comprise a plurality of individually named binary variables each of which corresponds to a respective table column in the plurality of table columns.

In an embodiment, the one or more runtime column selection variables comprise a plurality of individually named binary variables each of which corresponds to two or more respective table columns in the plurality of table columns.

In an embodiment, the one or more runtime column selection variables comprise a named array variable having a plurality of unnamed indexed array elements each of which corresponds to a respective table column in the plurality of table columns.

In an embodiment, the prepared query statement comprises component query statements that generate special marker values separating query results from two adjacent table columns in the first subset of table columns.

In an embodiment, the prepared query statement comprises a component query statement that returns a row count (e.g., a row count per column in the first subset of table columns, etc.) for query results of each table column in the first subset of table columns.

In an embodiment, a table column in the first subset of table columns is of a specific data type different from a common data type. The prepared query statement comprises a specific data conversion function that converts select results from the table column from the specific data type to the common data type.

In an embodiment, the query processing system is further configured to perform: applying a specific inverse data conversion function that is a mathematical inverse of the specific data type conversion function to converted select results generated from the specific data conversion function.

In some embodiments, process flows involving operations, methods, etc., as described herein can be performed through one or more computing devices or units.

In an embodiment, an apparatus comprises a processor and is configured to perform any of these operations, methods, process flows, etc.

In an embodiment, a non-transitory computer readable storage medium, storing software instructions, which when executed by one or more processors cause performance of any of these operations, methods, process flows, etc.

In an embodiment, a computing device comprising one or more processors and one or more storage media storing a set of instructions which, when executed by the one or more processors, cause performance of any of these operations, methods, process flows, etc. Note that, although separate embodiments are discussed herein, any combination of embodiments and/or partial embodiments discussed herein may be combined to form further embodiments.

4.0 IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
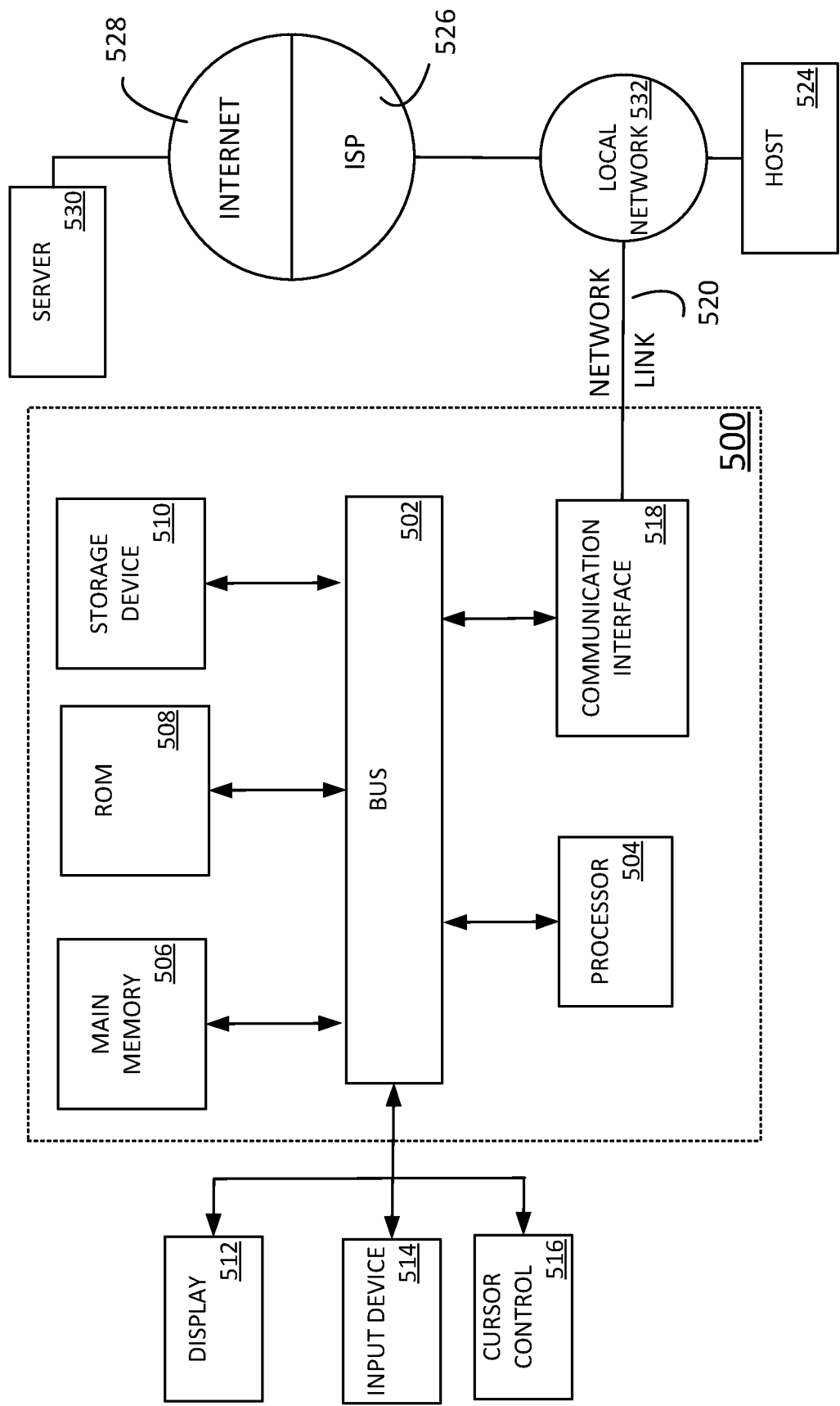
FIG. 5 illustrates an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is device-specific to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using device-specific hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

5.0 EQUIVALENTS, EXTENSIONS, ALTERNATIVES AND MISCELLANEOUS

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
   determining a query to be directed to a database table, wherein the query is to retrieve database values for a first proper subset of table columns in table columns of the database table;
   setting up column selection variables for the table columns of the database table;
   dynamically binding the column selection variables to single-column query statements that are joined into a database query statement, wherein each single-column query in the single-column query statements comprises a corresponding predicate for a respective table column in the table columns of the database table, wherein the corresponding predicate is evaluated to be true in response to determining, based on the column selection variables, that the respective table column belongs to the first proper subset of table columns;
   causing the database query statement to be executed to retrieve the database values for the first proper subset of table columns in the database table.

2. The method as recited in claim 1, wherein the column selection variables comprise individually named binary variables each of which corresponds to a respective table column in the table columns of the database table.

3. The method as recited in claim 1, wherein the column selection variables comprise individually named binary variables each of which corresponds to two or more respective table columns in the table columns of the database table.

4. The method as recited in claim 1, wherein the column selection variables comprise a named array variable having unnamed indexed array elements each of which corresponds to a respective table column in the table columns of the database table.

5. The method as recited in claim 1, wherein the database query statement comprises component query statements that generate special marker values separating query results from two adjacent table columns in the first proper subset of table columns.

6. The method as recited in claim 1, wherein the database query statement comprises a component query statement that returns a row count for query results of each table column in the first proper subset of table columns.

7. The method as recited in claim 1, wherein a table column in the first proper subset of table columns is of a specific data type different from a common data type; and wherein the database query statement comprises a specific data conversion function that converts select results from the table column from the specific data type to the common data type.

8. One or more non-transitory computer readable media storing a program of instructions that is executable by a device to perform:
determining a query to be directed to a database table, wherein the query is to retrieve database values for a first proper subset of table columns in table columns of the database table;
setting up column selection variables for the table columns of the database table;
dynamically binding the column selection variables to single-column query statements that are joined into a database query statement, wherein each single-column query in the single-column query statements comprises a corresponding predicate for a respective table column in the table columns of the database table, wherein the corresponding predicate is evaluated to be true in response to determining, based on the column selection variables, that the respective table column belongs to the first proper subset of table columns;
causing the database query statement to be executed to retrieve the database values for the first proper subset of table columns in the database table.

9. The media as recited in claim 8, wherein the column selection variables comprise individually named binary variables each of which corresponds to a respective table column in the table columns of the database table.

10. The media as recited in claim 8, wherein the column selection variables comprise individually named binary variables each of which corresponds to two or more respective table columns in the table columns of the database table.

11. The media as recited in claim 8, wherein the column selection variables comprise a named array variable having unnamed indexed array elements each of which corresponds to a respective table column in the table columns of the database table.

12. The media as recited in claim 8, wherein the database query statement comprises component query statements that generate special marker values separating query results from two adjacent table columns in the first proper subset of table columns.

13. The media as recited in claim 8, wherein the database query statement comprises a component query statement that returns a row count for query results of each table column in the first proper subset of table columns.

14. The media as recited in claim 8, wherein a table column in the first proper subset of table columns is of a specific data type different from a common data type; and wherein the database query statement comprises a specific data conversion function that converts select results from the table column from the specific data type to the common data type.

15. A system, comprising:
one or more computing processors;
one or more non-transitory computer readable media storing a program of instructions that is executable by the one or more computing processors to perform:
determining a query to be directed to a database table, wherein the query is to retrieve database values for a first proper subset of table columns in table columns of the database table;
setting up column selection variables for the table columns of the database table;
dynamically binding the column selection variables to single-column query statements that are joined into a database query statement, wherein each single-column query in the single-column query statements comprises a corresponding predicate for a respective table column in the table columns of the database table, wherein the corresponding predicate is evaluated to be true in response to determining, based on the column selection variables, that the respective table column belongs to the first proper subset of table columns;
causing the database query statement to be executed to retrieve the database values for the first proper subset of table columns in the database table.

16. The system as recited in claim 15, wherein the column selection variables comprise individually named binary variables each of which corresponds to a respective table column in the table columns of the database table.

17. The system as recited in claim 15, wherein the column selection variables comprise individually named binary variables each of which corresponds to two or more respective table columns in the table columns of the database table.

18. The system as recited in claim 15, wherein the column selection variables comprise a named array variable having unnamed indexed array elements each of which corresponds to a respective table column in the table columns of the database table.

19. The system as recited in claim 15, wherein the database query statement comprises component query statements that generate special marker values separating query results from two adjacent table columns in the first proper subset of table columns.

20. The system as recited in claim 15, wherein the database query statement comprises a component query statement that returns a row count for query results of each table column in the first proper subset of table columns.

* * * * *